US006611691B1

(12) United States Patent
Zhou et al.

(10) Patent No.: US 6,611,691 B1
(45) Date of Patent: Aug. 26, 2003

(54) ANTENNA ADAPTED TO OPERATE IN A PLURALITY OF FREQUENCY BANDS

(75) Inventors: Guangping Zhou, Lake Zurich, IL (US); Michael J. Kuksuk, Palatine, IL (US); Robert Kenoun, Palatine, IL (US); Zafarul Azam, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/219,561

(22) Filed: Dec. 24, 1998

(51) Int. Cl.[7] ............................ H04B 1/38; H01Q 1/24

(52) U.S. Cl. .......................... 455/550; 455/83; 455/73; 455/553; 343/709

(58) Field of Search ........................... 455/550, 73, 83, 455/552, 553, 82; 343/702, 895, 901, 900

(56) References Cited

U.S. PATENT DOCUMENTS

| | | | | | |
|---|---|---|---|---|---|
| 5,144,324 | A | * | 9/1992 | Chin et al. | 343/702 |
| 5,374,937 | A | * | 12/1994 | Tsunekawa et al. | 343/702 |
| 5,635,943 | A | * | 6/1997 | Grunwell | 343/702 |
| 5,717,409 | A | | 2/1998 | Garner et al. | 343/702 |
| 5,754,141 | A | * | 5/1998 | Thompson et al. | 343/702 |
| 5,794,158 | A | * | 8/1998 | Itoh | 455/550 |
| 5,812,097 | A | * | 9/1998 | Maldonado | 343/790 |
| 5,836,005 | A | * | 11/1998 | Chang | 343/702 |
| 5,856,808 | A | * | 1/1999 | Holshouser et al. | 343/702 |
| 5,867,127 | A | * | 2/1999 | Black et al. | 343/702 |
| 5,923,297 | A | * | 7/1999 | Kim et al. | 343/702 |
| 5,963,170 | A | * | 10/1999 | Garner et al. | 343/702 |
| 5,963,871 | A | * | 10/1999 | Zhinong et al. | 455/550 |
| 5,982,330 | A | * | 11/1999 | Koyanagi et al. | 343/702 |
| 6,229,489 | B1 | * | 5/2001 | Holshouser et al. | 343/702 |
| 6,351,241 | B1 | * | 2/2002 | Wass | 343/702 |
| 6,369,775 | B1 | * | 4/2002 | Moore et al. | 343/702 |
| 6,459,916 | B1 | * | 10/2002 | Suguro | 455/575 |
| 2002/0039081 | A1 | * | 4/2002 | Cassel et al. | 343/702 |

FOREIGN PATENT DOCUMENTS

| | | | |
|---|---|---|---|
| EP | 0 747 990 A1 | 11/1996 | H01Q/1/24 |
| EP | 0 755 091 A1 | 1/1997 | H01Q/9/32 |
| EP | 0 825 672 A2 | 2/1998 | H01Q/5/00 |
| GB | 2 206 243 A | 6/1987 | H01Q/5/00 |
| WO | WO 97/30489 | 8/1997 | H01Q/1/36 |
| WO | WO 97/41621 | 11/1997 | H01Q/5/00 |

* cited by examiner

*Primary Examiner*—Dwayne Bost
*Assistant Examiner*—Kamran Afshar
(74) *Attorney, Agent, or Firm*—John J. King; Roland K. Bowler II; Lawrence J. Chapa

(57) ABSTRACT

A novel retractable antenna which enables dual-band operation in two different positions of the antenna is described. Further, the novel retractable antennas are couple to a variety matching circuit arrangements according to various embodiments of the present disclosure to eliminates the use of electrical or mechanical switching of two different matching circuits.

14 Claims, 13 Drawing Sheets

ANTENNA ADAPTED TO OPERATE IN A PLURALITY OF FREQUENCY BANDS

FIELD OF THE INVENTION

This application is related to an antenna, and more particularly to an antenna adapted to operate in more than one frequency band.

BACKGROUND OF THE INVENTION

With the increased use of wireless communication devices, spectrum has become scarce. In many cases, network operators providing services on one particular band have had to provide service on a separate band to accommodate its customers. For example, service in a given region could be provided on a GSM system in a 900 MHz frequency band and on a DCS system at an 1800 MHz frequency band, or even a third system, such as a PCS system in a 1900 frequency band. Similarly, service in another region could include an AMPS system in an 800 MHz frequency band and a PCS system in a 1900 frequency band. Although a single network operator may not provide service in both systems in a given region, a user of a wireless communication device may like the opportunity to roam in the event he is unable to obtain service on one of the systems. Accordingly, wireless communication devices, such as cellular radio telephones, must be able to communicate at both frequencies.

Further, in a device having a retractable whip antenna in the down or retracted position, the whip is still fed by coupling energy into the antenna through the bushing. Accordingly, the antenna must be rematched the down position. A conventional mechanical switch or a pin diode can be used to change the matching circuit between the antenna and the transceiver when in up and down positions. However, there are several disadvantages of using the switch for changing the matching circuit in the up and down positions. Aside from making the circuitry more complicated, switches add additional power loss when transmitting and receiving. More importantly, a mechanical switch is easily broken and a pin diode switch can be easily broken down by static discharge. Accordingly, there is a need for an antenna which can operate on more than one frequency, including such an antenna being retractable and having a novel matching circuit for the up and down positions.

DESCRIPTION OF THE PREFERRED EMBODIMENT

Figure 10:
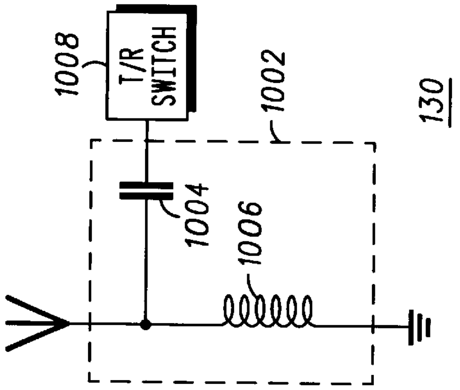
FIG. 10 is a circuit diagram showing the matching circuit of FIG. 1 according to the present invention.

The rapid developments in the wireless communications industry demand novel antenna designs that can be used in more than one frequency band. Typically, a dual-band antenna is required to operate at both 800 MHz AMPS and 1900 MHz PCS in the U.S., or 900 MHz GSM and 1800 MHz DCS bands in Europe. A tri-band antenna is required to operate at three of the bands.

The present disclosure is related to an antenna adapted to receive signals in multiple frequency bands. In particular, the antenna preferably comprises a fixed whip antenna and a helical coil antenna coupled to a single feedpoint. A single matching circuit is adapted to provide matching for both the whip antenna and the helical coil antenna, while also providing static protection. According to one embodiment, the antenna can also be reduced in size by attaching a disc to the end of the whip portion of the antenna, while decreasing the pitch of the helical coil. A dielectric material preferably surrounds the whip portion and provides support for the helical coil antenna. An attachment member allowing the antenna to be coupled to the wireless communication device acts as a monopole which is top loaded with the fixed whip antenna and the helical coil antenna. Finally, a clip can be used to provide a feed point for the antenna to further reduce the electrical lengths of the fixed whip antenna and a helical coil antenna.

The antenna according to an alternate embodiment of the present invention is preferably retractable and has a straight whip with a helical wire mounted on top. The antenna is fed both in up and down positions by coupling RF energy through the metal bushing. In the extended position, the dual frequencies are resonated by the length of the whip and a matching circuit coupled to the bottom of the whip. In the retracted position, an extra matching circuit, such as an LC network, is preferably connected at some other point along the whip, so that the whip is equivalent to an open circuit at the feed location.

In the up position, an LC network is needed at the feed point for the matching. Since the retracted whip part is about ¼ wavelength (at AMPS/GSM band) and ½ wavelength (at DCS/PCS band), a novel technique to match the antenna is to electrically disconnect the whip at the feed point.

This is done by introducing a load impedance at a point at the bottom of the whip which will be transformed into a high impedance state at the feed point for both bands. The high impedance at the feed point is equivalent to eliminating the whip from the antenna in down position. The required load impedance, preferably either a series or a parallel LC circuit, should have a low impedance value at AMPS/GSM and high impedance value at DCS/PCS bands. Therefore, the antenna in down position is equivalent to a self-resonant dual band antenna. Various embodiments of a variety of antennas and different matching circuits located at one or more points on the antenna (such as the feed point at the top of the whip, the bottom of the whip, or at a point between the top and the bottom of the whip) will be described in detail in the remaining figures.

Figure 1:
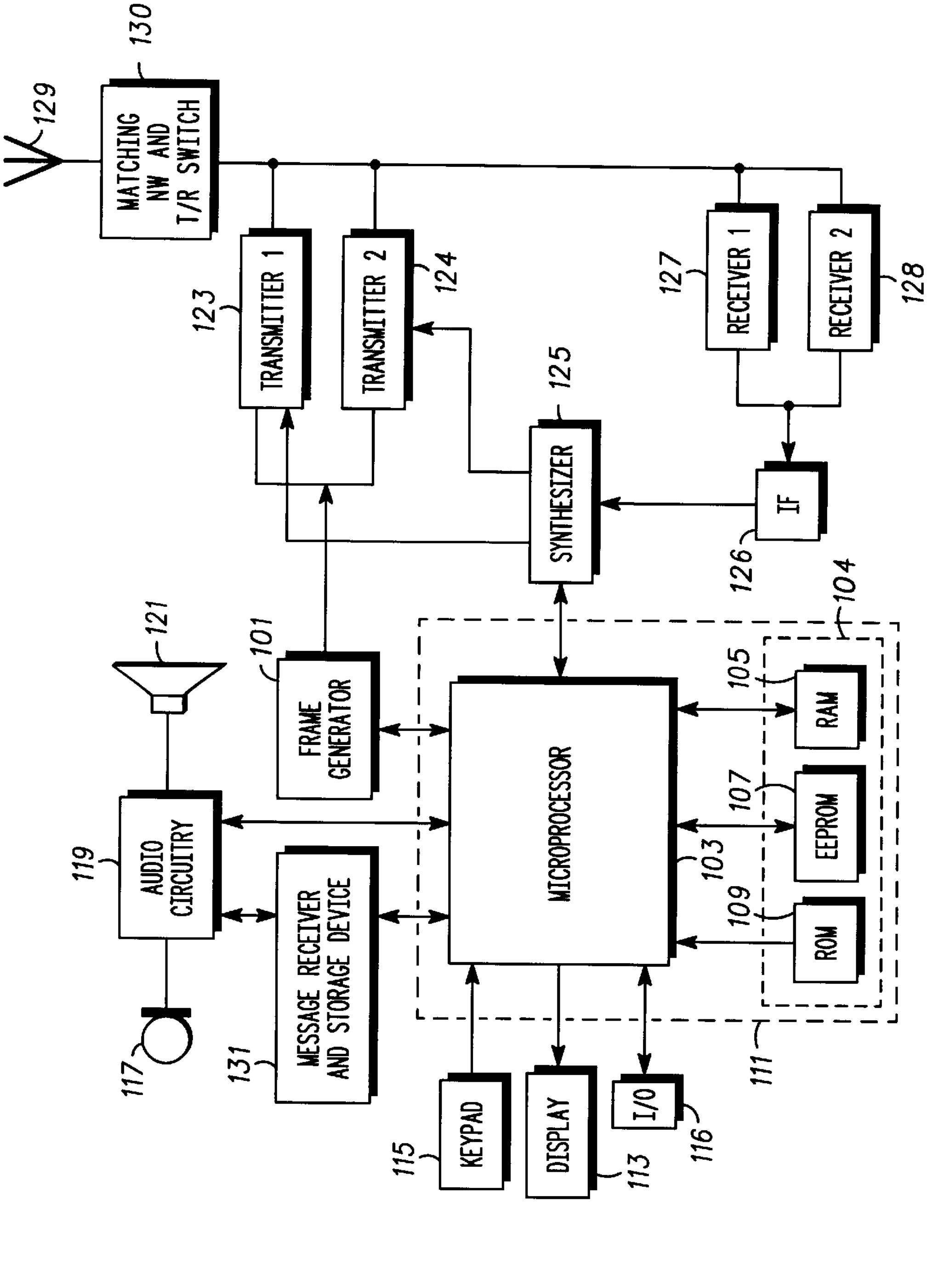
FIG. 1 is a block diagram of a wireless communication device, such as a cellular radio telephone, according to the present invention.

Turning first to FIG. 1, a block diagram of a wireless communication device such as a dual band cellular radiotelephone incorporating the present invention is shown. In the preferred embodiment, a frame generator ASIC 101, such as a CMOS ASIC available from Motorola, Inc. and a microprocessor 103, such as a 68HC11 microprocessor also available from Motorola, Inc., combine to generate the necessary communication protocol for operating in a cellular system. Microprocessor 103 uses memory 104 comprising RAM 105, EEPROM 107, and ROM 109, preferably consolidated in one package 111, to execute the steps necessary to generate the protocol and to perform other functions for the communication unit, such as writing to a display 113, accepting information from a keypad 115, controlling a frequency synthesizer 125, or performing steps necessary to amplify a signal according to the method of the present invention. ASIC 101 processes audio transformed by audio circuitry 119 from a microphone 117 and to a speaker 121.

A transceiver processes the radio frequency signals. In particular, a transmitters 123 and 124 transmit through an antenna 129 using carrier frequencies produced by a frequency synthesizer 125. Information received by the communication device's antenna 129 enters receivers 127 and 128 through a matching network and transmit/receive switch 130. A preferred matching network and transmit/receive switch 130 will be shown in more detail in FIG. 10. Receivers 127 and 128 demodulate the symbols comprising the message frame using the carrier frequencies from frequency synthesizer 125. The transmitters and receivers are collectively called a transceiver. The communication device may optionally include a message receiver and storage device 131 including digital signal processing means. The message receiver and storage device could be, for example, a digital answering machine or a paging receiver.

Figure 2:
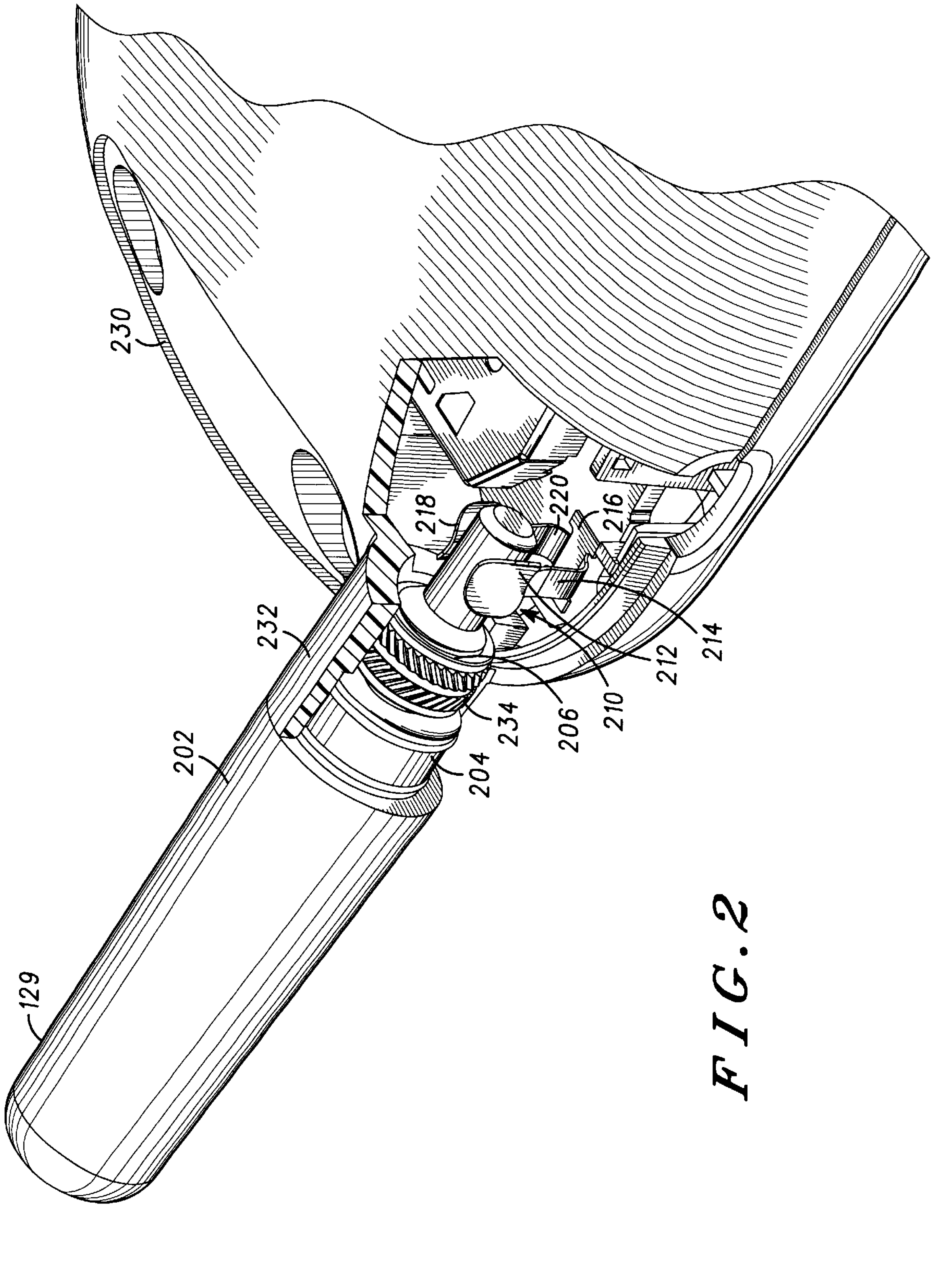
FIG. 2 is a partial perspective view of an antenna coupled to the wireless communication device of FIG. 1.

Turning now to FIG. 2, a partial cross-sectional view shows an antenna according to the present invention coupled to a wireless communication device, such as that shown in FIG. 1. Antenna 129 comprises an outer housing or overmold 202 having a sleeve 204. A monopole 205 comprises a threaded portion 206 which extends to a coupling portion 208. The length of the monopole generally effects vertical polarization, where a longer monopole generally provides greater vertical polarization. The monopole will be described in more detail in reference to the remaining figures.

The antenna is coupled to a clip 210 having a contact element 212 at the end of a flexible arm 214 which is coupled to a base portion 216. Base portion 216 is preferably attached to a circuit board having circuitry of FIG. 1 or some other suitable circuit. Bracket 210 further includes a second contact 218 coupled to flexible arm 220 which also extends to base portion 216. Coupling portion 208 is retained by flexible arms 214 and 220 which also provide an electrical contact. The dimensions of the flexible arms are preferably selected to optimize the efficiency of the antenna. That is, the length and width of the flexible arms are selected to provide the proper inductance or capacitance for the antenna, where a narrower arm provides greater inductance and wider arm provides greater capacitance.

FIG. 2 also shows a housing 230 of the wireless communication device of FIG. 1. The housing includes a receiving sleeve 232, shown in partial cross-section, which retains a threaded nut 234 for receiving threaded portion 206 of the antenna. Although the feed point of the antenna is preferably made at contact elements 212 and 218 near the base of coupling portion 205, the feed point could be made at the threaded nut 234 according to the present invention.

Figure 4:
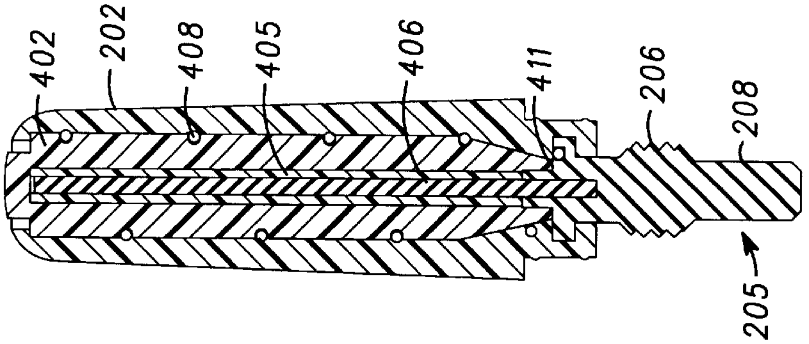
FIG. 4 is a cross-sectional view of the antenna of FIG. 3 according to the present invention.
Figure 3:
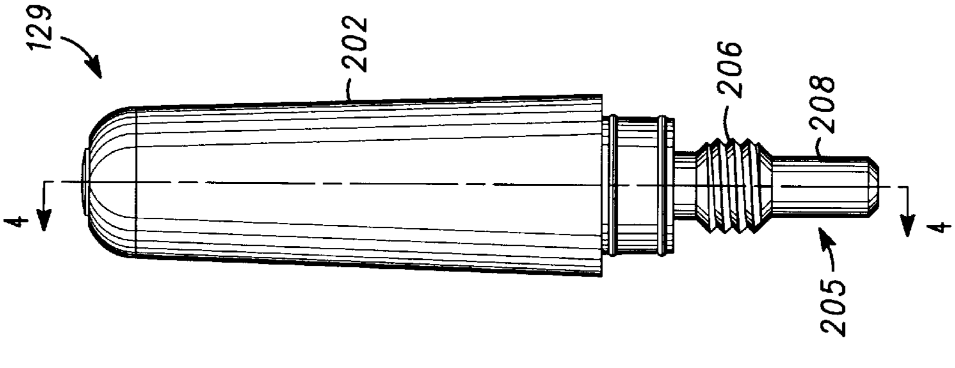
FIG. 3 is a plan view of an antenna according to the present invention.

Turning now to FIG. 3, a plan view shows antenna 129 detached from the wireless communication device. A cross-sectional view in FIG. 4 shows the cross-section of one embodiment of the antenna. In particular, a dielectric core 404 within the overmold 202 preferably comprises a dielectric material. For example, the core could be a dielectric material comprising santaprene and polypropylene. For example, the dielectric core could be composed of 75% santoprene and 25% polypropylene to create dielectric material having a dielectric constant of 2.0. Within dielectric core 402 is a dielectric sleeve 405 covering a whip antenna 406 which is a substantially straight wire. For example, dielectric sleeve 405 could be a Teflon material. Dielectric core 402 preferably has a dielectric constant $\in_1$ dielectric sleeve preferably has a dielectric constant $\in_2$, where $\in_1 > \in_2$. In addition to providing a wider bandwidth, dielectric sleeve 405 provides mechanical strength to the antenna. As long as $\in_1 > \in_2$, solid plastic could also be used. Alternatively, the area with the sleeve could remain empty, whereby air which has a dielectric constant of $\in=1$ would provide good electrical characteristics. Depending upon the bandwidth considerations, the sleeve can also be removed, as will be shown in some of the remaining figures.

Also, within a helical recess 407 formed in dielectric core 402 is a helical coil antenna 408. Although the helical coil antenna is formed on the outer edge of the dielectric core 402, the helical antenna could also be completely surrounded by dielectric core 402. Both the whip antenna and the helical coil antenna are electrically connected to the monopole 205. In particular, a lower portion 410 of the whip antenna is coupled to monopole 205 in a recess in a shoulder portion 411 of the monopole, while a lower portion 412 of helical coil antenna 408 is also coupled to a recess in the monopole. Although the helical coil antenna is shown to substantially surround the whip antenna, the helical coil antenna could be adjacent to the whip antenna.

Figure 5:
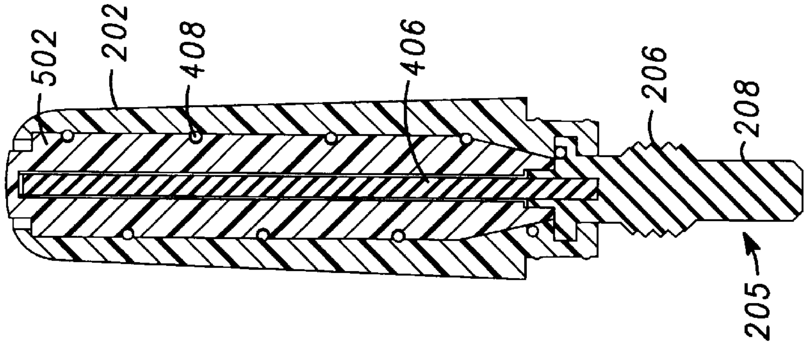
FIG. 5 is a cross-sectional view of an alternate embodiment of the antenna according to the present invention.

Turning now to FIG. 5, an alternate embodiment of the cross-sectional view of the antenna is shown. In particular, dielectric sleeve 405 is eliminated, leaving a dielectric core 502 surrounding whip antenna 406.

Figure 6:
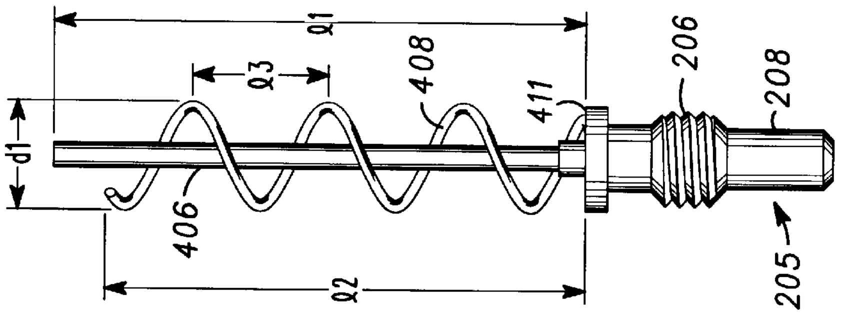
FIG. 6 is a plan view of antenna elements of FIG. 5 according to the present invention.

Turning now to FIG. 6, the perspective view of FIG. 6 shows whip antenna 406 and helical coil antenna 408 according to the present invention without any overmold or dielectric layers. In order to transmit and receive signals in the DCS band (1710–1880 MHz frequencies) and the PCS band (1850–1990 MHz frequencies), the whip antenna is selected to be a length $l_1$ of approximately 28.1 (+/−0.5) mm as measured from the shoulder of the monopole. In order to transmit and receive signals in the GSM band (880–960 MHz frequencies), the whip antenna is selected to be a length $l_1$ of approximately 25.4 (+/−0.8) mm with a pitch dimension $l_3$ of approximately 7.15 mm and approximately 3.7 turns as also measured from the shoulder of the monopole.

Figure 8:
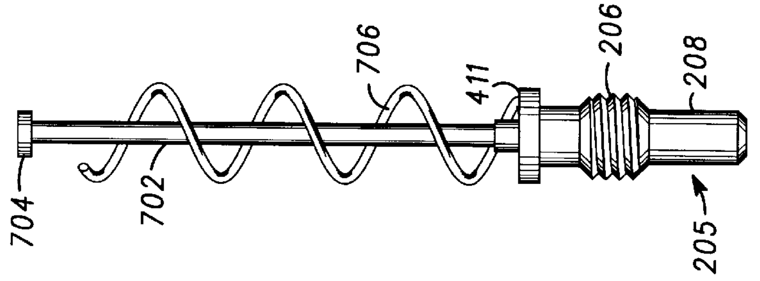
FIG. 8 is a plan view of antenna elements of FIG. 7 according to the present invention.
Figure 7:
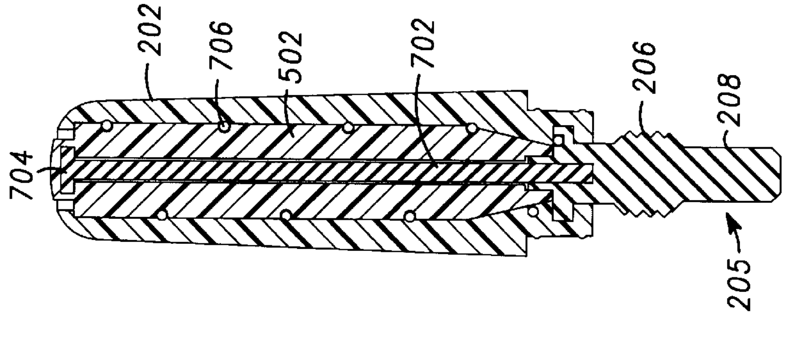
FIG. 7 is a cross-sectional view of an alternate embodiment of the antenna according to the present invention.

Turning now to FIGS. 7 and 8, an alternate embodiment of the present invention shows a shorter whip portion 702 having a disc 704 on the end of the antenna to shorten the overall length of the antenna. The pitch dimension of the helical coil antenna could also be reduced to enable the shortened length of the antenna. Other dimensions for the frequency bands mentioned or other frequency bands could be used according to the present invention.

Figure 9:
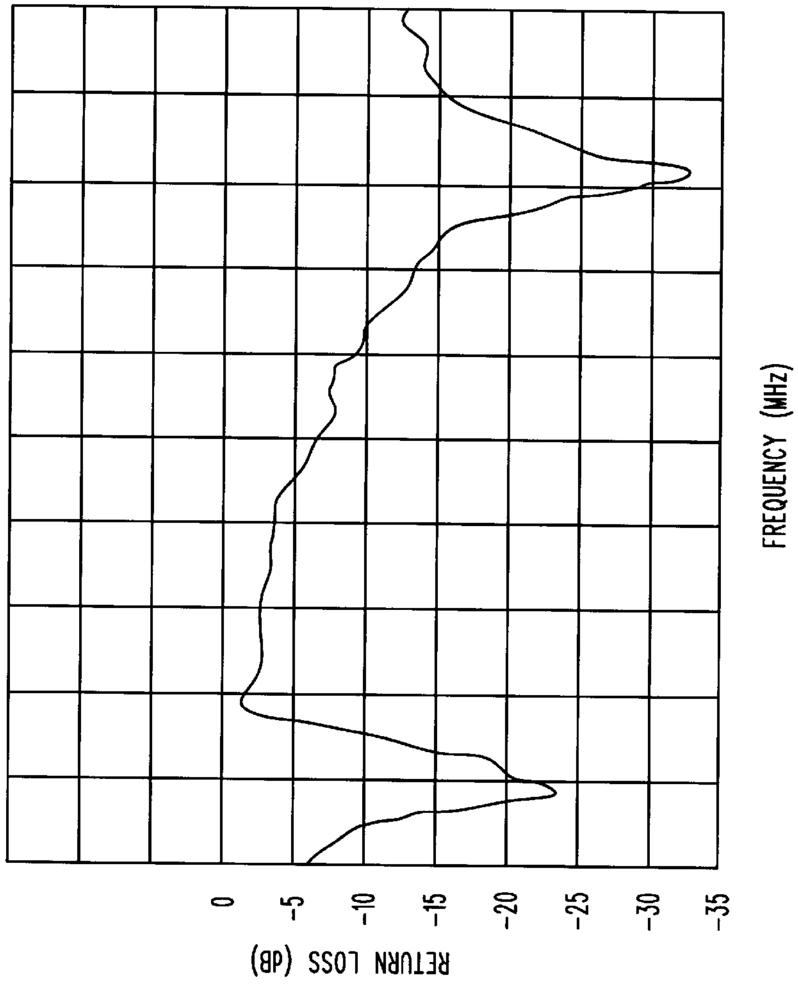
FIG. 9 is a chart showing the frequency response of the antenna of FIG. 5.

Turning now to FIG. 9, a graph shows the return loss in 5 dB increments as a function of frequency according to the antenna of FIG. 5 of the present invention. As can be seen in the figure, the antenna will operate signals between 830–960 MHz band and 1710–2000 MHz band at −10 dB return loss which covers the frequency bands of AMPS, GSM, DCS, PCS, and PHS. With modifying the length of the whip antenna and the helical coil, the resonating frequency can be tuned to any frequency band desired.

Turning now to FIG. 10, a matching network and transmit/receive switch 130 s shown in more detail. In particular, a matching network 1002 comprising a capacitor 1004 and an inductor 1006. In order to function as a matching network for the GSM, PCS and DCS bands, capacitor 1004 could be approximately 4.7 pf while inductor 1006 is approximately 8.2 nH, for example. Another benefit of the matching network is that the inductor provides a DC path for providing static protection. Finally, any conventional transmit/receive switch 1008 could be used according to the present invention.

Figure 11:
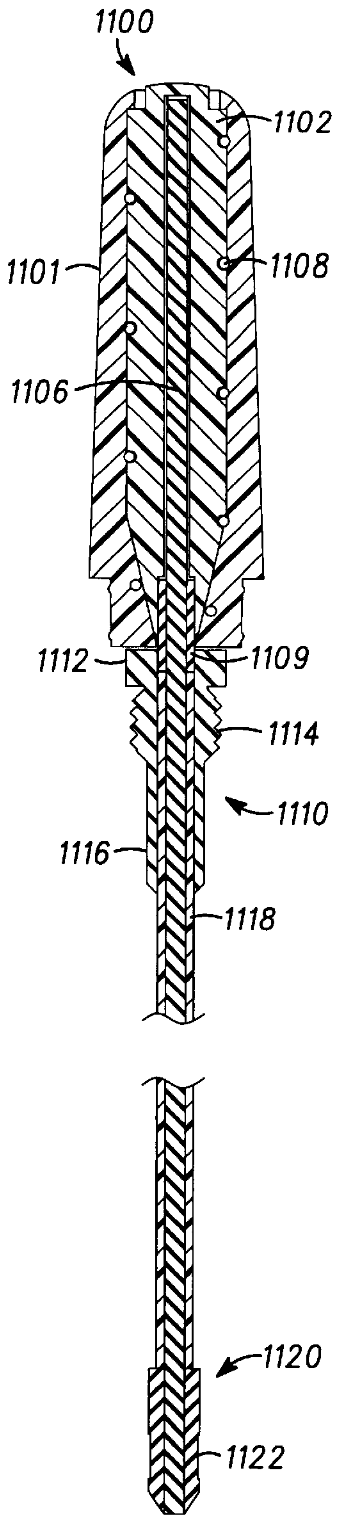
FIG. 11 is a cross-sectional view of an alternate embodiment of an antenna according to the present invention.

Turning now to FIG. 11, a cross-sectional view of an alternate embodiment of an antenna 1100 according to the present invention is shown. In particular, a dielectric core 1102 within the overmold 1101 preferably comprises a dielectric material. The core and the overmold could comprise the same materials as those described in FIG. 4. Within dielectric core 1102 is a whip portion 1106 which is a substantially straight wire. Also, a helical coil antenna 1108 is coupled to a conductor member 1109. Conductor member 1109 enables a direct electrical contact of the helical portion and the top portion of whip portion 1106 to a bushing 1110 when the antenna is in the down position. The helical coil and the conductor member could be, for example, a quarter wavelength in the GSM band. Bushing 1110, which is movable with respect to overmold 1101 and whip portion 1106, includes a shoulder portion 1112, a threaded portion 1114 and a sleeve portion 1116, and acts as a feedpoint for the helical coil and the top portion of the whip. Accordingly, when the antenna is in the down position, the helical coil and the top portion of the whip function in the same manner as the antenna of FIG. 5.

Figure 12:
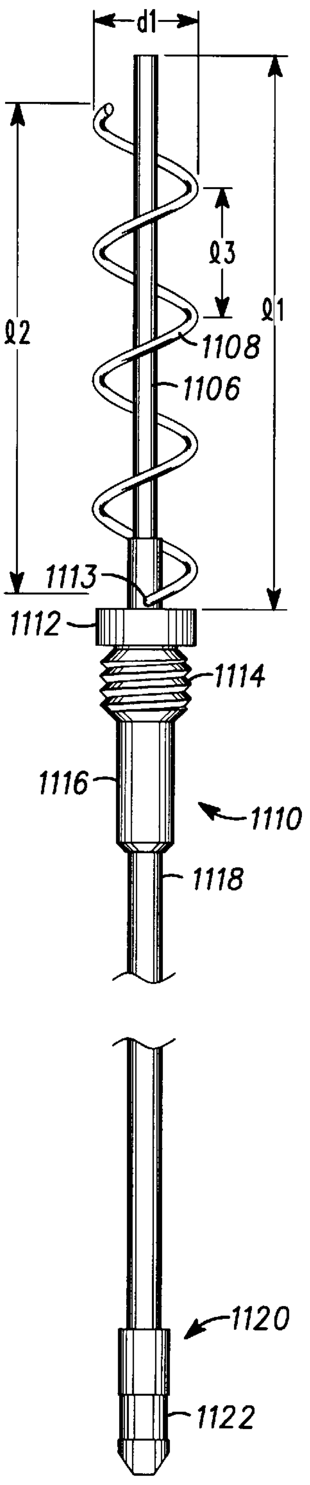
FIG. 12 is a plan view of antenna elements of FIG. 11 according to the present invention.

An insulating portion 1118 covers the whip portion from conductor member 1109 to a contact 1120 at the distal end of the whip. Contact 1120 preferably includes a recess 1122 extending around the contact to receive a contact on a circuit board to hold the antenna in the up position, as will be described in detail in reference to later figures. A plan view of antenna elements of FIG. 11 without dielectric materials is shown in FIG. 12. As described earlier with respect to FIG. 6, the dimensions of the helical coil and the properties of the dielectric material can be selected depending upon the desired frequency in the down position.

Figure 13:
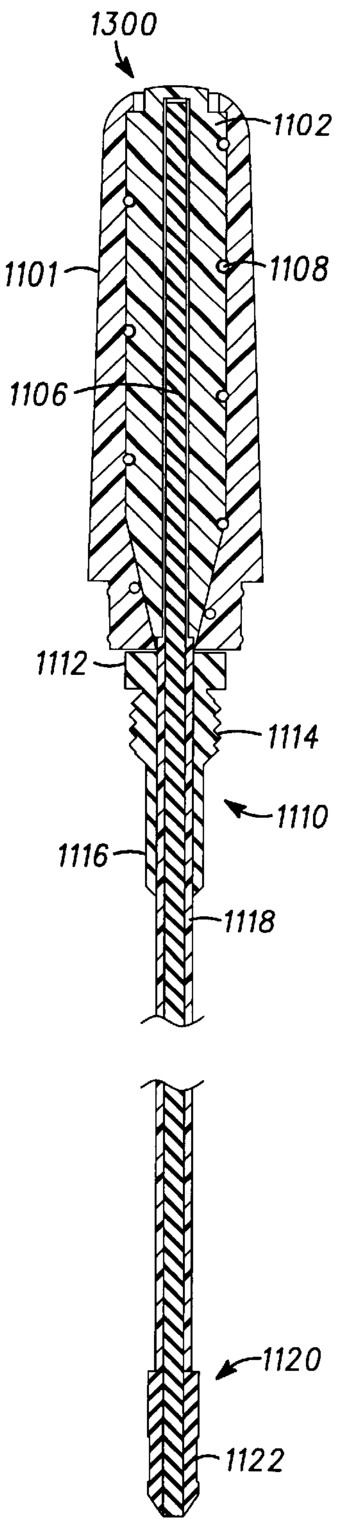
FIG. 13 is a cross-sectional view of an alternate embodiment of an antenna according to the present invention.
Figure 14:
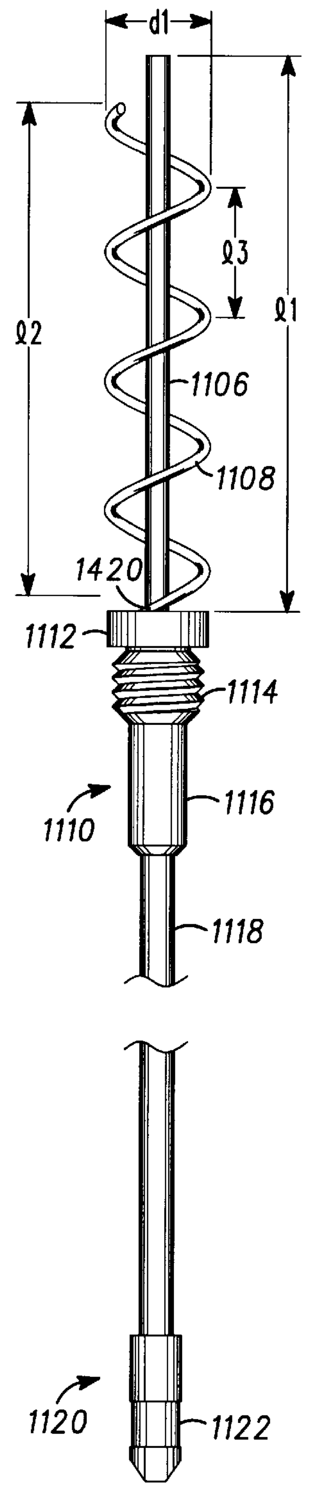
FIG. 14 is a plan view of antenna elements of FIG. 13 according to the present invention.

Turning now to FIG. 13, a cross-sectional view of an alternate embodiment of an antenna according to the present invention is shown. The structure is substantially the same as the antenna of FIG. 11, except the antenna of FIG. 13 does not include conductor member 1109. Rather, helical coil 1108 is connected directly to whip portion 1106. Therefore, the helical coil and the upper portion of the whip are capacitively coupled to bushing 1110. The direct connection of helical coil 1108 to whip portion 1106 can be seen more clearly in FIG. 14

Figure 15:
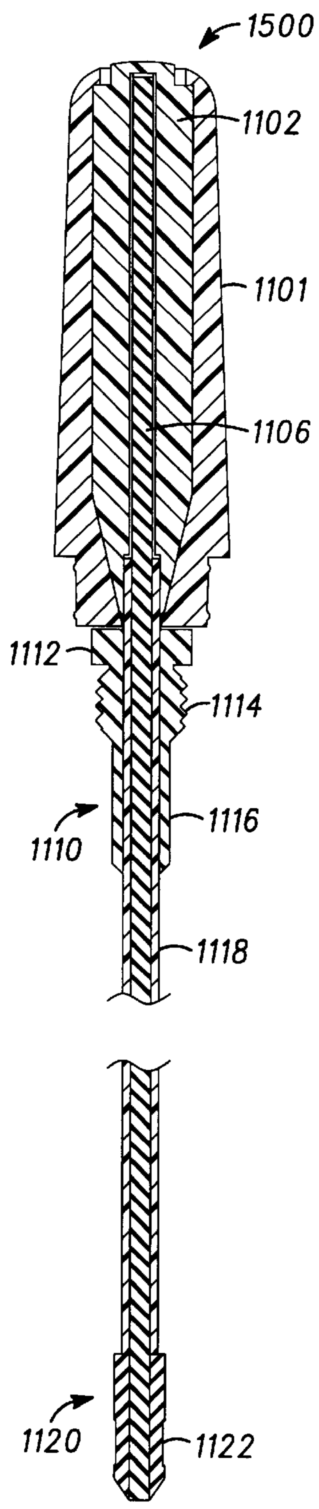
FIG. 15 is a cross-sectional view of an alternate embodiment of an antenna according to the present invention.

Turning now to FIG. 15, a cross-sectional view of an alternate embodiment of an antenna according to the present invention is shown. In particular, the helical coil is no longer present, and the whip portion comprises the antenna element. As will be described in more detail in reference to the remaining figures, the antenna could be capacitively coupled to bushing 1110 in the down position and directly coupled to bushing 1110 when recess 1122 makes contact to the bushing in the up position.

Figure 16:
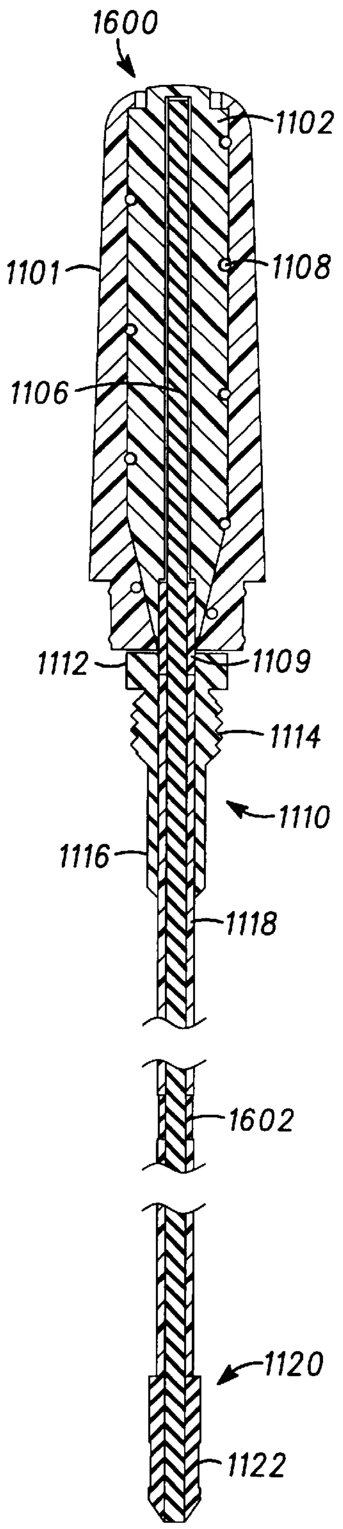
FIG. 16 is a cross-sectional view of an alternate embodiment of an antenna according to the present invention.
Figure 17:
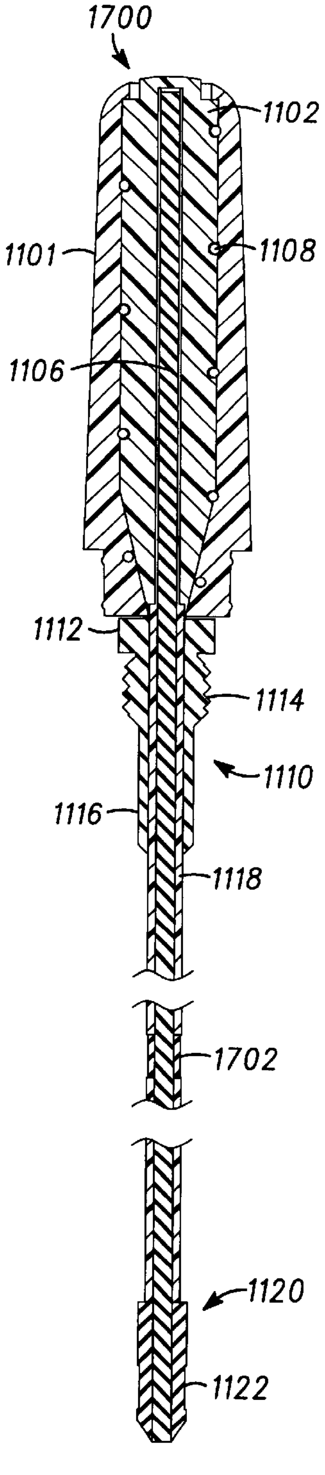
FIG. 17 is a cross-sectional view of an alternate embodiment of an antenna according to the present invention.

Turning now to FIGS. 16 and 17, cross-sectional views of an alternate embodiment of an antenna according to the present invention are shown. FIGS. 16 and 17 correspond to FIGS. 11 and 13, respectively, but include a metal contact, contacts 1602 and 1702. As will be described in detail in reference to the remaining figures, contacts 1602 and 1702 enable a direct coupling of whip portion 1106 to a matching circuit on a circuit board of a wireless communication device when the antenna is in the down position.

Figure 18:
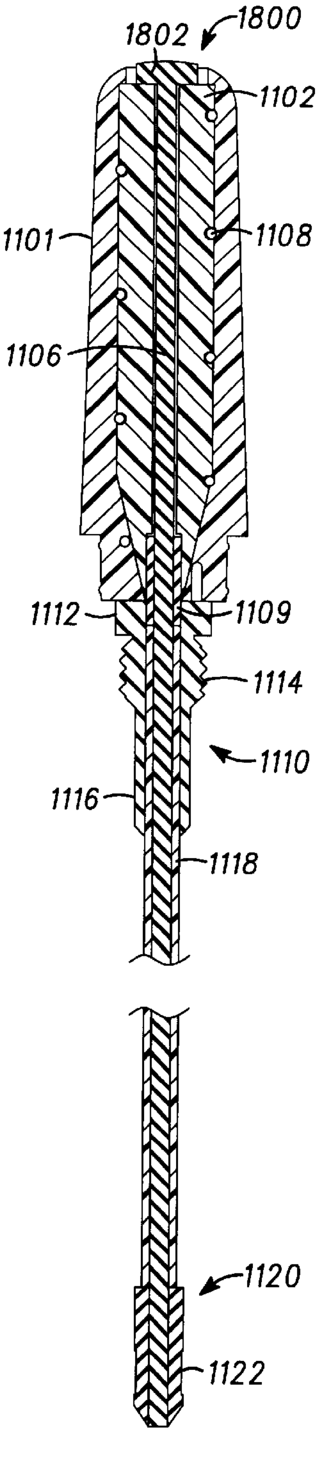
FIG. 18 is a cross-sectional view of an alternate embodiment of an antenna according to the present invention.
Figure 19:
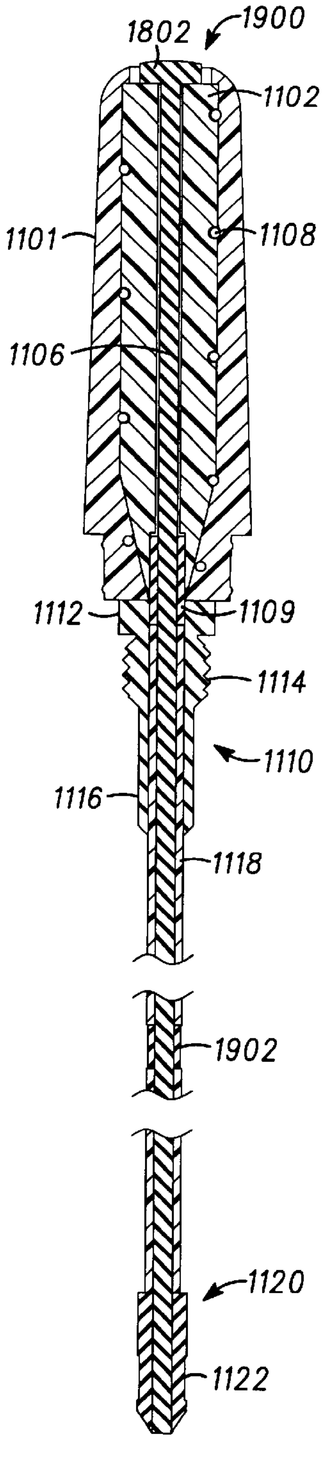
FIG. 19 is a cross-sectional view of an alternate embodiment of an antenna according to the present invention.

Turning now to FIG. 18, a cross-sectional view of alternate embodiments of an antenna according to the present invention is shown. According to the embodiment of FIG. 18, the whip portion is movable with respect to the helical portion. In particular, a cap 1802 is connected to the top portion of whip portion 1106, while overmold 1101, dielectric core 1102 and helical coil 1108 remain fixed with respect to bushing 1110. Whip portion 1106 and helical coil 1108 are preferably directly coupled to contact member 1109, which provides a direct contact to bushing 1110. Alternatively, whip portion 1106 could be capacitively coupled to bushing 1110 if conductor member 1109 is removed. The embodiment of FIG. 19 further includes contact 1902 to enable a direct contact to a matching circuit, as will be described in more detail in reference to the remaining figures.

The antennas described above intended for operation at dual band frequencies such as AMPS (824–894 MHz) and PCS (1850–1990 MHz) or GSM (890–960 MHz) and DCS (1710–1880 Mhz) and preferably have a single feed point. However, it can be used for any dual band or single band transceiver. The bandwidth can be narrow or wide. The same antenna element can be used in more than transceiver with or without a match change. Any of the antennas shown in FIGS. 11–19 could be employed in any of the various circuit board configurations having various matching circuit arrangements described in reference to FIGS. 20–29.

Figure 20:
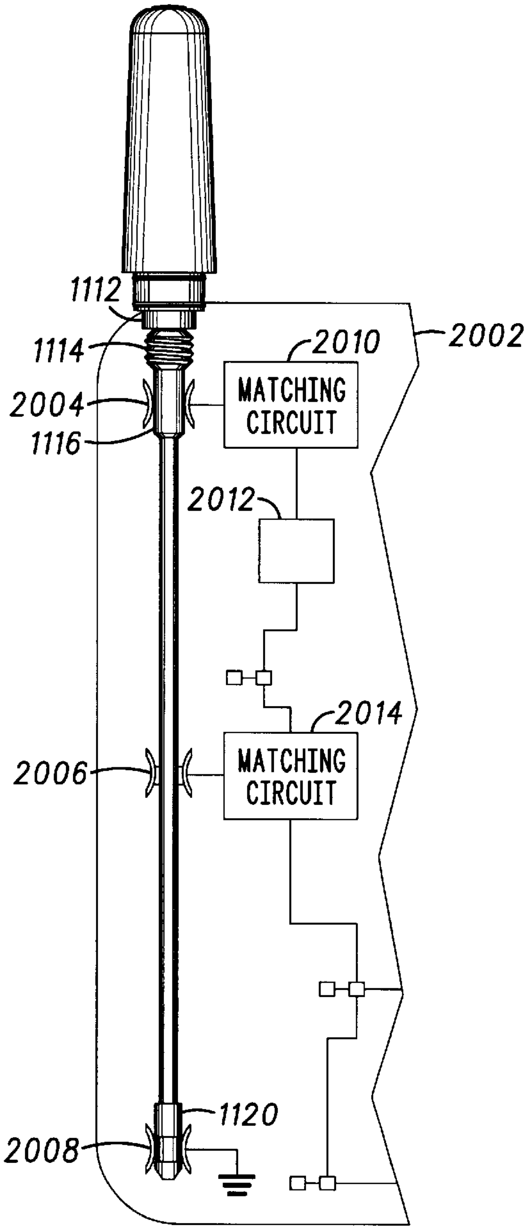
FIG. 20 is a plan view of a circuit board for a wireless communication device incorporating an antenna according to the present invention.

Turning first to FIG. 20, a plan view of a circuit board 2002 for a wireless communication device incorporating an antenna according to the present invention is shown. The circuit board includes contacts 2004, 2006, and 2008. Upper contact 2004 preferably acts as a single feed point and is coupled to a matching circuit 2010, which is coupled to communication circuitry 2012. When the antenna is in the down position, most of the whip is retracted inside the phone housing. If the whip is selected as ¾ wavelength in the DCS band, a ¼ wavelength portion could be above the feedpoint and a ½ wavelength portion could be below the band. For an antenna designed for the AMPs and DSC bands where the whip is approximately ¾ wavelengths of the PCS band, a ¼ wavelength portion of the whip could extend above the feedpoint. This part of the whip not only mismatches the antenna but also radiates RF energy into the circuits on the PC board, which causes more phase errors and EM interference. Accordingly, a matching circuit 2010 is used to electrically open this part of the whip at the bottom of the whip, so that this part of the whip is equivalently disconnected from the antenna in the down position. Because the length of the retracted part of antenna is about ¼ wave length for AMPS/GSM and ½ wave length for DCS/PCS, we can matching network 2014, preferably comprising an LC network. This has a short (or low impedance) for AMPS/GSM frequency but an open (or high impedance) for DCS/PCS frequency. A second matching circuit 2014 can be coupled to middle contact 2006. Matching circuits are well known in the art, and could include any LC network, such as the circuit shown in FIG. 10. The value of the capacitor and the inductor are selected depending upon a number of factors, including the desired frequency, the dimensions, shape and compositions of the antenna elements, housings, etc. A second matching circuit 2014 is preferably coupled to middle contact 2006. The location of the middle contact 2006 along the whip portion 1106 is selected by design choice including consideration of the factors in selecting the matching network. Finally, lower contact 2008, which is coupled to ground, is directly coupled to recess 1122.

Figure 21:
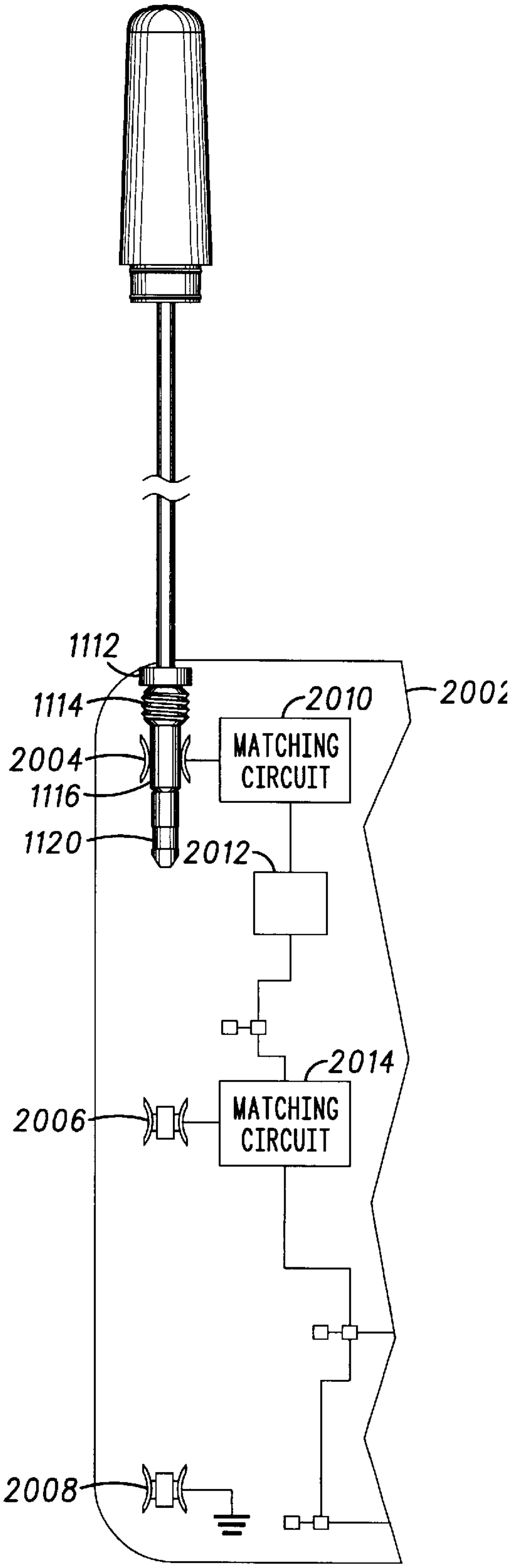
FIG. 21 is a plan view of a circuit board for a wireless communication device incorporating an antenna according to the present invention.
Figure 22:
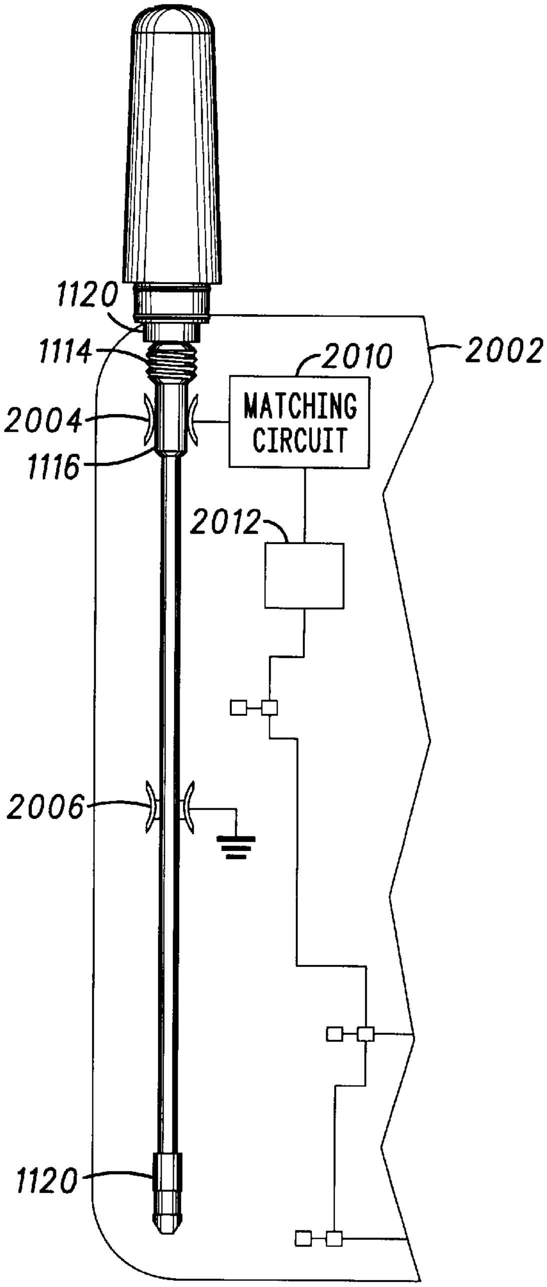
FIG. 22 is a plan view of a circuit board for a wireless communication device incorporating an antenna according to the present invention.

FIG. 21 shows an antenna of the present invention in the up position. In the up position, the whip is fed by coupling energy into the antenna through the metal bushing. Two modes of antenna operation are excited by the choice of match, antenna length, and couple bushing. The antenna is adjusted to have the first resonant mode on AMPS/GSM bands and the second resonant mode on DCS/PCS bands. The length of the whip portion 1106 could be, for example, ¾ of the wavelength for a frequency in the DCS band. Alternatively, it could be ¾ wavelength in the PCS band, and ⅓ wavelength in the AMPS band. Because the resonant frequencies are also affected by ground plane, shield cans, and PCB characteristics, to get the return loss less than about 10 dB over the dual bands, the matching circuit might need to be fine tuned for different size and characteristics of PC boards and shield cans. In the embodiment of FIG. 22, middle contact 2006 can be coupled to ground in place of a matching circuit.

Figure 23:
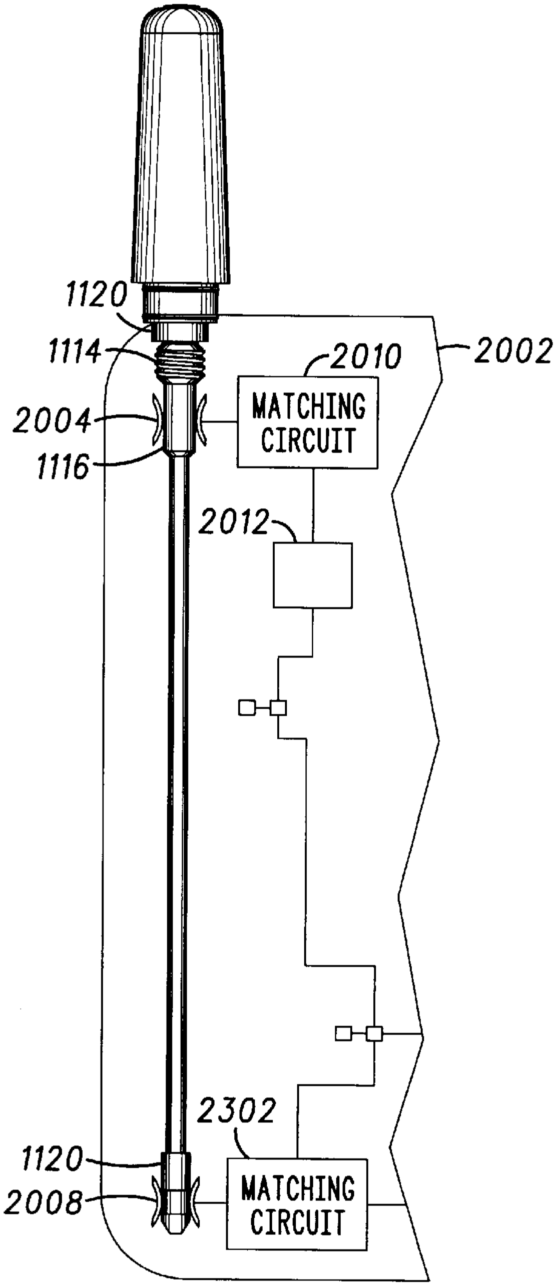
FIG. 23 is a plan view of a circuit board for a wireless communication device incorporating an antenna according to the present invention.
Figure 25:
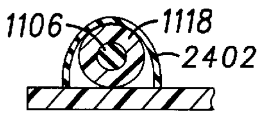
FIG. 25 is a cross sectional view of a circuit board for a wireless communication device incorporating an antenna according to the present invention.

Turning now to FIG. 23, a plan view of an alternate embodiment of a circuit board for a wireless communication device incorporating an antenna according to the present invention is shown. As is shown, middle contact 2006 is coupled to ground, while a matching circuit 2302 is coupled to lower contact 2008.

The retracted whip acts like a transmission line. A load impedance at the bottom of the whip will be transformed transmission line formula $$Z=Zc(ZL+jZc\ \tan(l)/(Zc+jZL\ \tan(l).$$

Therefore, a ¼ wave length transmission line for AMPS/GSM will transform a low impedance at lower contact 2008 to high impedance at upper contact 2004. But a ½ wave length transmission line for DCS/PCS still transforms a high impedance at lower contact 2008 to a high impedance at upper contact 2004. Matching circuit 2302, in addition to the existing match for the transceiver at the feedpoint at the bushing, improves the antenna performance by providing a short at the lower band of frequencies and an open at the higher band of frequencies.

There are many ways to generate a network with low impedance for AMPS/GSM and high impedance for DCS/PCS. Two of the easiest ways include parallel resonant circuits and series resonant circuits. For example, a parallel circuit with L=1 nH and C=7 pF will make a 6.5 Ohm impedance for 840 MHz but 5 k Ohm impedance for 1900 MHz. A series circuit with L=22 nH and C=1.5 pF will make 0.03 Ohm for 840 MHz but 206 Ohm for 1900 MHz. With the matching of the load impedance and whip transmission line, the retracted position of the antenna is close to a quarter wave length for the PCS/DCS frequency (which is resonant at PCS/DCS) and a short dipole at AMPs/GSM frequency (which is resonant at AMPs/GSM freq.)

Figure 24:
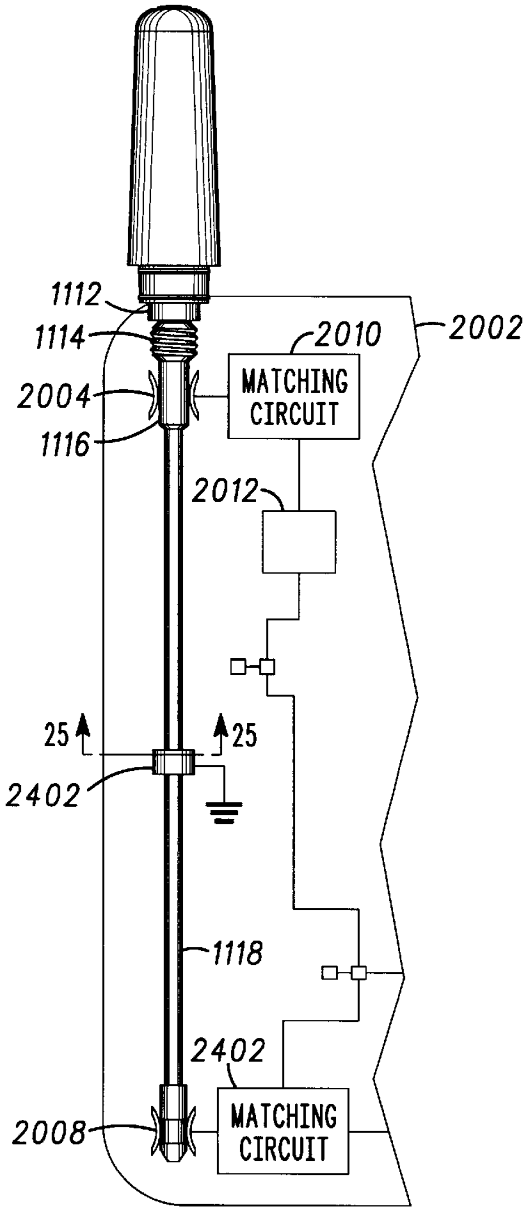
FIG. 24 is a plan view of a circuit board for a wireless communication device incorporating an antenna according to the present invention.

Turning now to FIG. 24, a plan view of a circuit board for a wireless communication device incorporating an antenna according to the present invention is shown. Since the retracted whip is not a perfect transmission line and the LC network cannot provide perfect short for AMPs/GSM and open for DCS/PCS, coupling to ground can be used to improve antenna performance as seen in FIG. 24. The coupling point is not a direct contact. A cylindrical ring 2402 coupled to matching circuit 2014 enables capacitive coupling to the antenna. A cross section of the ring in shown in FIG. 25. The location and amount of coupling are chosen to provide the desired antenna performance. This coupling to ground improves the open/short match of the antenna thereby improving the antenna performance when retracted. An alternative match is shown in FIGS. 20 and 21, where the matching circuit is connected to the middle of the whip, but the bottom of the whip is grounded.

Figure 26:
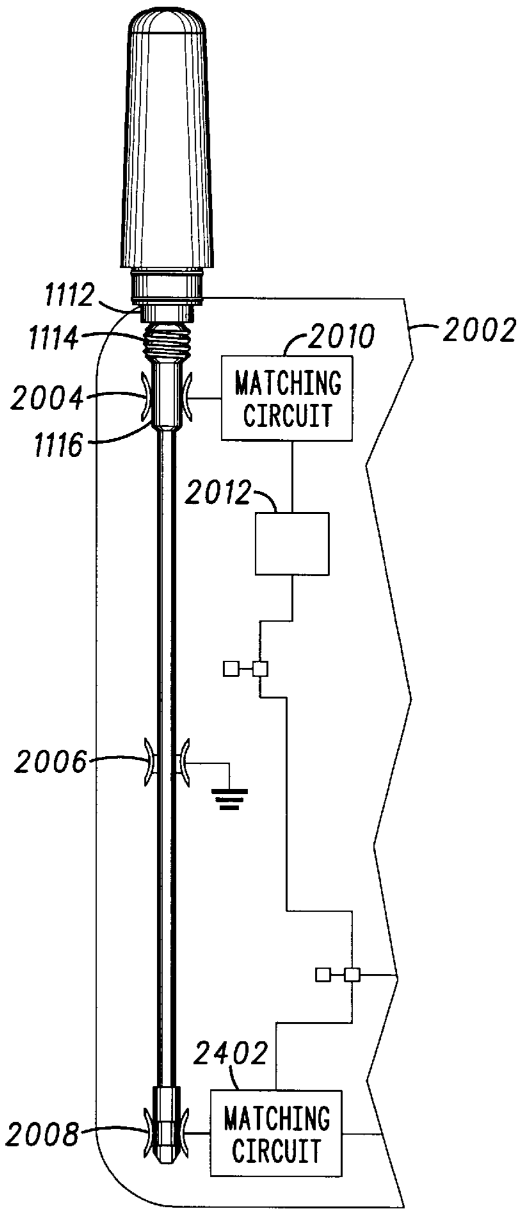
FIG. 26 is a plan view of a circuit board for a wireless communication device incorporating an antenna according to the present invention.
Figure 27:
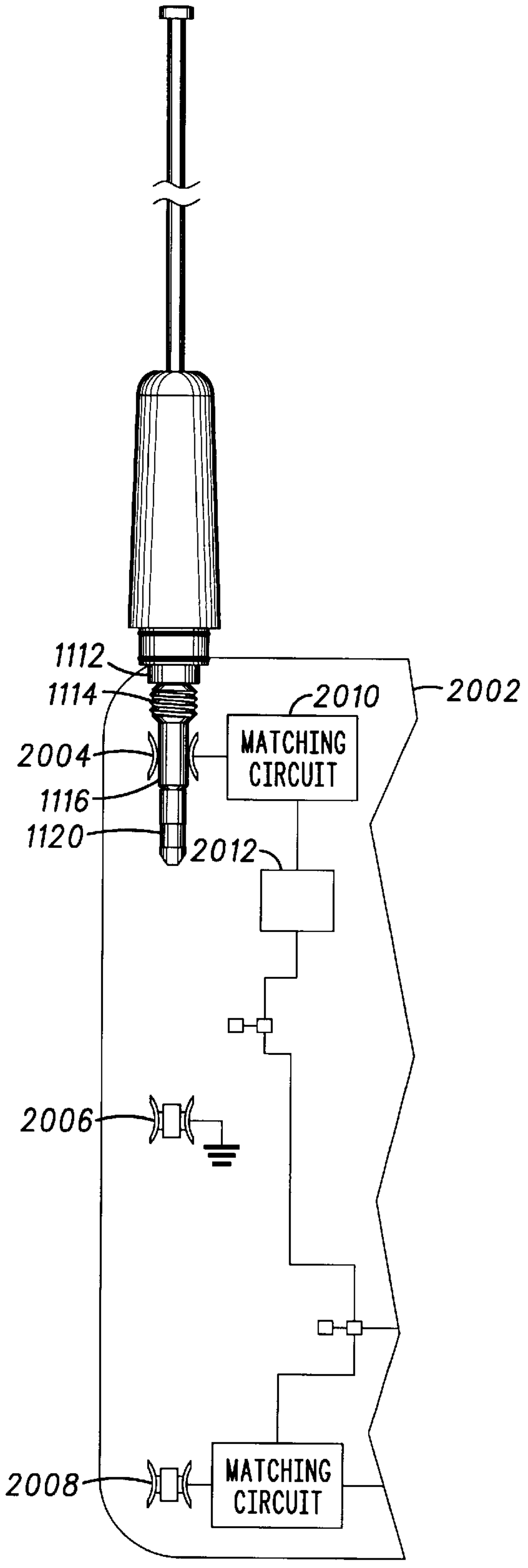
FIG. 27 is a plan view of a circuit board for a wireless communication device incorporating an antenna according to the present invention.

Turning now to FIGS. 26 and 27, plan views of a circuit board for a wireless communication device incorporating the antenna of FIG. 18 is shown in the down position and up position respectively.

Figure 28:
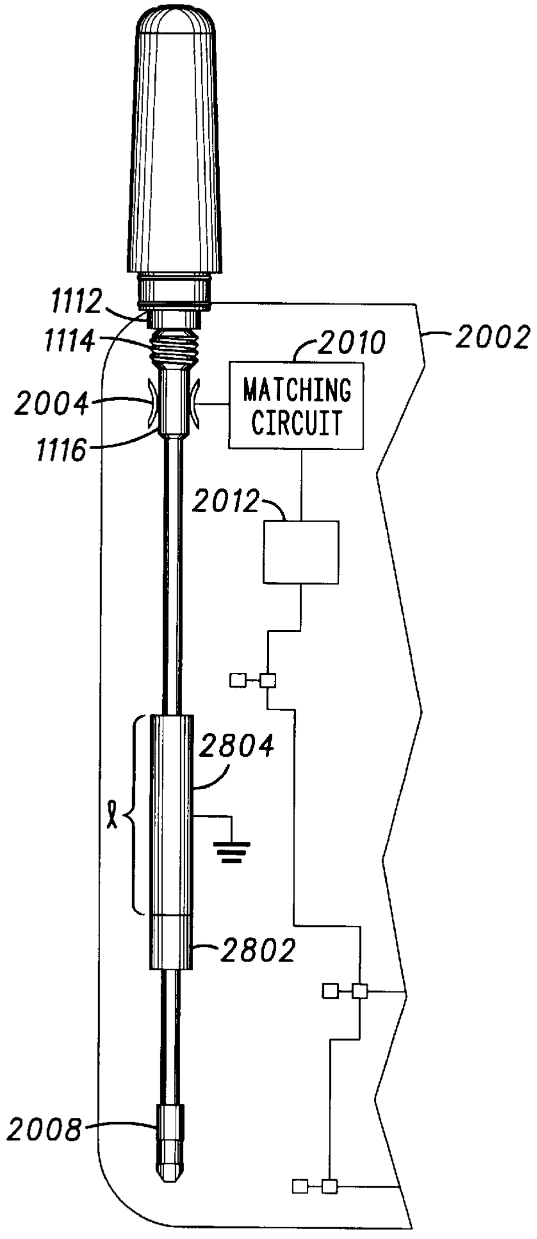
FIG. 28 is a plan view of a circuit board for a wireless communication device incorporating an antenna according to the present invention.
Figure 29:
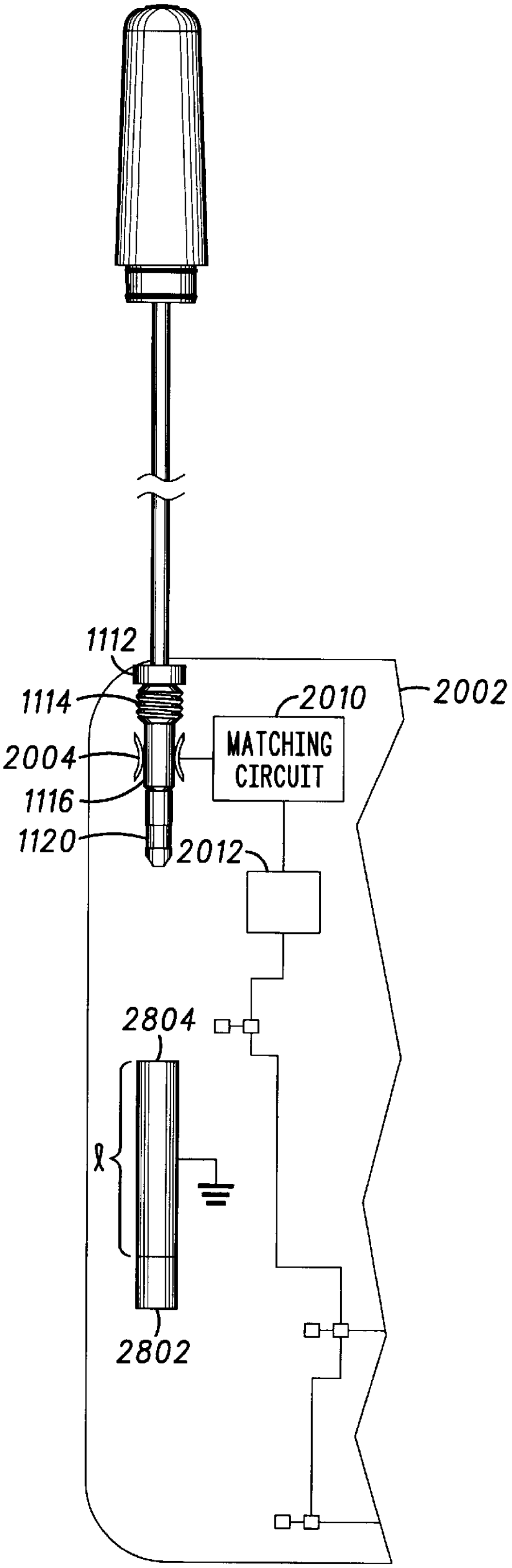
FIG. 29 is a plan view of a circuit board for a wireless communication device incorporating an antenna according to the present invention.

Turning now to FIGS. 28 and 29, a plan view of a circuit board for a wireless communication device incorporating an antenna according to the present invention and a novel metalized tube or straw is shown. As is shown in FIG. 28, a tube 2802 has a metalized portion 2804 extending a length "l". The length can be adjusted to properly match the antenna as needed. The metalized tube preferably replaces a matching circuit coupled to middle contact 2006. The metalized tube and the whip of the antenna form a coaxial transmission line. The impedance of the transmission line is characterized using transmission line theory and can be varied by adjusting the length and diameter of the metalized portion of the tube. In particular, the impedance characteristics of the enclosed transmission line is $$Z_0=(60/\sqrt{(E_r)})\cdot \ln(D/d).$$

where $Z_0$=characteristic impedance

D=outside diameter d=inside diameter $E_r$=relative dielectric constant.

The impedance of the whip not covered by the tube is covered by the equation set forth earlier. Properly choosing the length of the metalized portion of the tube will provide the right impedance for the antenna matching. Alternatively, a matching circuit could be used in conjunction with tube 2802.

Figure 30:
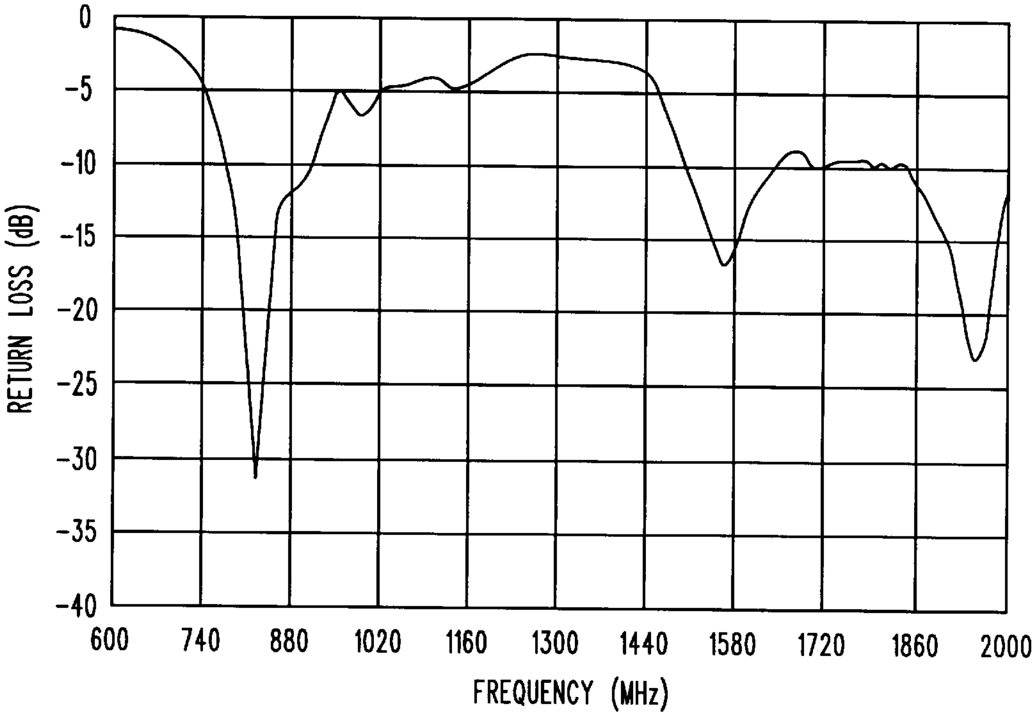
FIG. 30 is a chart showing the frequency response of a retractable antenna of the present invention in the up position.
Figure 31:
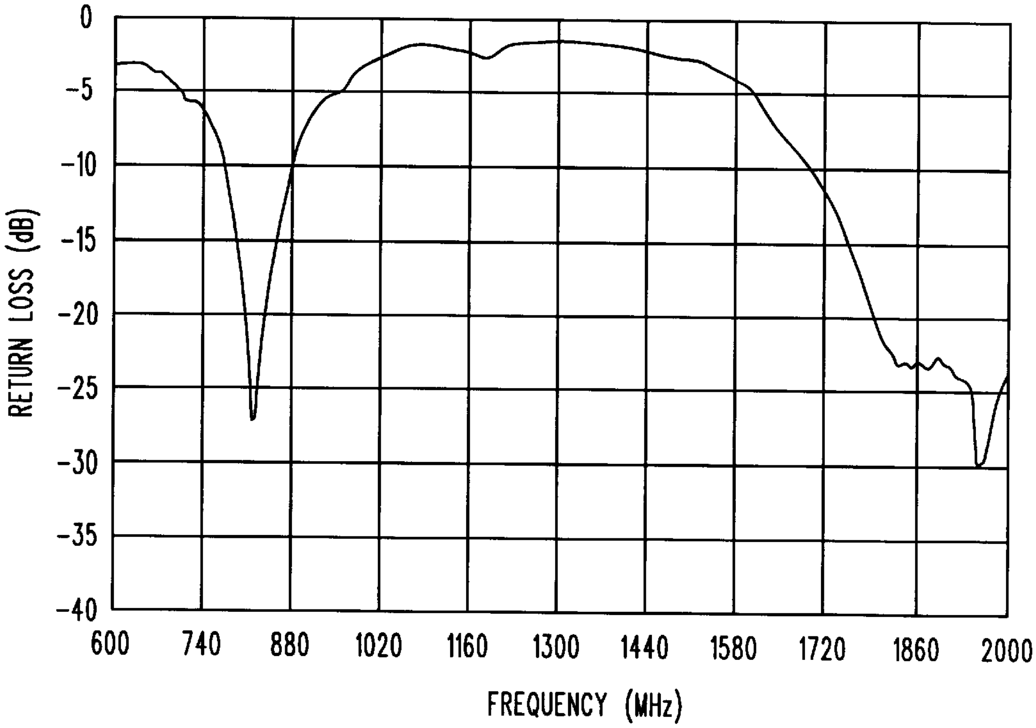
FIG. 31 is a chart showing the frequency response of a retractable antenna of the present invention in the down position.

Turning now to FIGS. 30 and 31, graphs show the return loss in 5 dB increments as a function of frequency according to the antennas of FIGS. 11–19 of the present invention in the down and up positions respectively. By modifying the length of the whip antenna and the helical coil, the resonating frequency can be tuned to any frequency band desired.

Although the invention has been described and illustrated in the above description and drawings, it is understood that this description is by way of example only and that numerous changes and modifications can be made by those skilled in the art without departing from the true spirit and scope of the invention. Although the various embodiments of FIGS. 20–29 show contacts 2004, 2006, and 2008 as being either direct coupling or capacitive coupling, direct coupling contacts and capacitive coupling contacts could be freely interchanged. Similarly, any antenna of FIGS. 11–19 could be employed with circuit board configuration of FIGS. 20–29, as modified with direct or capacitive coupling for contacts 2004, 2006 or 2008. Although the present invention finds particular application in portable cellular radiotelephones, the invention could be applied to any wireless communication device, including pagers, electronic organizers, or computers. Applicants' invention should be limited only by the following claims.

We claim:

1. A retractable antenna coupled to a transceiver by a single feed point, adapted to operate in at least two bands, said retractable antenna comprising:

a whip portion;

a first contact coupled to said whip portion;

a first matching circuit coupled to said first contact for matching the impedance of said whip portion to the transceiver when said whip portion is in an extended position and when said whip portion is in a retracted position;

a second contact coupled to said whip portion when said antenna is in said retracted position forming a retracted portion of the whip portion extending along said whip portion between the first and second contact; and a second matching circuit coupled to said second contact, said second matching circuit giving said retracted portion of said whip portion a high impedance at a first frequency band and a low impedance at a second frequency band such that radio frequency (RP) energy is not directed to said retracted portion of said whip portion.

2. The retractable antenna of claim 1, wherein said first contact is a first feed point for transferring RF energy between said retractable antenna and said first matching circuit.

3. The retractable antenna of claim 1, wherein a third contact is coupled to said retractable antenna between said first contact and said second contact.

4. The retractable antenna of claim 3, wherein said third contact is further coupled to ground.

5. The retractable antenna of claim 2, further comprising a helical coil surrounding said whip portion.

6. The retractable antenna of claim 5, wherein said helical coil is electrically coupled to said whip portion.

7. A retractable antenna coupled to a transceiver by a single feed point adapted to operate in at least two bands, said retractable antenna comprising:

a whip portion;

a first contact coupled to said whip portion wherein said first contact is a feed point for transferring radio frequency (RF) energy between said first contact and said whip portion;

a first matching circuit coupled to said first contact for matching the impedance of said whip portion to the transceiver;

a second contact selectively coupled to said whip portion in response to a relative position of said retractable antenna to said second contact; and a second matching circuit coupled to said second contact, said second matching circuit giving a selected portion of said whip portion a high impedance at a first frequency band and a low impedance at a second frequency when said whip portion is selectively coupled to said second contact.

8. The retractable antenna of claim 7, wherein the selected portion extends along said whip portion between said first contact and said second contact.

9. The retractable antenna of claim 7, wherein a third contact is coupled to said retractable antenna between said first contact and said second contact.

10. The retractable antenna of claim 9, wherein said third contact is further coupled to ground.

11. The retractable antenna of claim 7, further comprising a helical coil surrounding said whip portion.

12. The retractable antenna of claim 11, wherein said helical coil is coupled to said whip portion.

13. A retractable antenna in a multi-band receive, comprising:

a whip portion movable between extended and retracted positions;

a contact coupled to the whip portion in the retracted position; and an impedance matching circuit coupled to the whip portion by said contact when the whip portion is retracted, said impedance matching circuit providing said whip portion with a high impedance at a first frequency band and a low impedance at a second frequency band.

14. The retractable antenna of claim 13, a helical coil coupled to the whip portion.

* * * * *